United States Patent
Hsu et al.

(10) Patent No.: US 9,925,600 B2
(45) Date of Patent: Mar. 27, 2018

(54) CENTER LOCATOR FOR HOLE CUTTER

(71) Applicants: Yao-Hsien Hsu, Lukang Township, Changhua County (TW); Huang-Ming Hsu, Lukang Township, Changhua County (TW)

(72) Inventors: Yao-Hsien Hsu, Lukang Township, Changhua County (TW); Huang-Ming Hsu, Lukang Township, Changhua County (TW)

(73) Assignees: Yao-Hsien Hsu, Changhua County (TW); Huang-Ming Hsu, Changhua County (TW); Chin-Fa Kao, Changhua County (TW)

( * ) Notice: Subject to any disclaimer, the term of this patent is extended or adjusted under 35 U.S.C. 154(b) by 13 days.

(21) Appl. No.: 15/067,907

(22) Filed: Mar. 11, 2016

(65) Prior Publication Data
US 2017/0259351 A1    Sep. 14, 2017

(51) Int. Cl.
*B23B 51/04* (2006.01)
*B23B 51/00* (2006.01)
*B23B 49/04* (2006.01)

(52) U.S. Cl.
CPC .......... *B23B 51/0054* (2013.01); *B23B 49/04* (2013.01); *B23B 51/04* (2013.01);
(Continued)

(58) Field of Classification Search
CPC .......... B23B 51/0426; B23B 2260/056; B23B 51/0018; B23B 51/0054; B23B 2270/20;
(Continued)

(56) References Cited

U.S. PATENT DOCUMENTS 2,211,634 A * 8/1940 Baker ................... B23B 47/28
                                                    408/115 R
4,137,003 A * 1/1979 Budoff ................. B23B 47/287
                                                    144/69
(Continued)

FOREIGN PATENT DOCUMENTS

DE    10305696 A1 * 8/2004 ............. B23B 45/06
EP    0206566 A1 * 12/1986

OTHER PUBLICATIONS

Machine translation, German patent document, DE10305696, "Hole saw for use on drill chuck of electric hand drill to produce breaks on gypsum plaster boards, has centering facility which is connected to manual control device", Gruber, B., Aug. 2004.*

*Primary Examiner* — Daniel Howell
*Assistant Examiner* — Chwen-Wei Su
(74) *Attorney, Agent, or Firm* — Egbert Law Offices, PLLC (57) ABSTRACT

A center locator is operated with a hole center for enlarging a round opening and includes a center seat having a through hole centrally defined therein, wherein the through hole is adapted to allow a centering drill of the hole cutter extending through the center seat. At least one adjusting device is longitudinally mounted to the center seat and formed with an engaging portion, wherein the at least one adjusting device is expandable relative to the center seat for adjusting a distance between the engaging portion of the at least one adjusting device and a center of the center seat.

7 Claims, 9 Drawing Sheets

(52) U.S. Cl.
CPC ....... *B23B 51/0018* (2013.01); *B23B 51/0426* (2013.01); *B23B 2247/04* (2013.01); *B23B 2260/056* (2013.01); *Y10T 408/5583* (2015.01); *Y10T 408/563* (2015.01); *Y10T 408/56337* (2015.01); *Y10T 408/885* (2015.01); *Y10T 408/8928* (2015.01)

(58) Field of Classification Search
CPC ........... B23B 2260/058; B23B 2231/28; Y10T 408/557; Y10T 408/558; Y10T 408/5583; Y10T 408/563; Y10T 408/56337; Y10T 408/885; Y10T 408/8928
See application file for complete search history.

(56) References Cited

U.S. PATENT DOCUMENTS

| | | | | |
|---|---|---|---|---|
| 4,579,486 | A * | 4/1986 | Damico | B23B 51/0426 408/115 R |
| 4,594,032 | A * | 6/1986 | Warburg | B23B 47/288 408/115 R |
| 4,945,793 | A * | 8/1990 | von Haas | B23B 29/046 82/157 |
| 4,955,406 | A * | 9/1990 | Antoniello | F16L 41/065 137/318 |
| 8,137,036 | B2 * | 3/2012 | Wadley | B23B 49/026 408/1 R |
| 2012/0257938 | A1 * | 10/2012 | Adkins | B23B 47/288 408/115 R |
| 2015/0174670 | A1 * | 6/2015 | Steele | B23B 51/05 408/36 |
| 2016/0089730 | A1 * | 3/2016 | Kocherovsky | B23C 5/2472 407/88 |

* cited by examiner

CENTER LOCATOR FOR HOLE CUTTER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a center locator, and more particularly to a center locator for hole cutter.

2. Description of Related Art Including Information Disclosed Under 37 CFR 1.97 and 37 CFR 1.98.

A hole cutter includes a seat having a centering drill centrally extending therefrom. The centering drill is used to drill a center bore in a plate. The seat has two opposite ends respectively having a cutting tool mounted thereon for cutting a circumference on the plate for processing an enlarged hole. The hole cutter usually processes an opening on wooden ceiling for mounting a lamp.

However, there are some disadvantages in the operating experience of the conventional hole cutter. For example, the hole cutter needs to use the centering drill to drill a center bore, previously. However, the operator usually processes a coaxially enlarged opening by using an original opening. Consequently, the centering drill cannot drill the center bore in the opening such that the operator needs to prepare another plate to closing the original opening and drill the center bore in the plate before processing the enlarged opening. The conventional operating processes for processing an enlarged opening by using an original hole waste time and have a low working effect.

The present invention has arisen to mitigate and/or obviate the disadvantages of the conventional hole cutter.

BRIEF SUMMARY OF THE INVENTION

The main objective of the present invention is to provide an improved center locator that is provided to holding a hole cutter during cutting a circumference on a plate for processing an enlarged hole.

To achieve the objective, the center locator in accordance with the present invention comprises a center seat having a through hole centrally defined therein, wherein the through hole is adapted to allow a centering drill 11 of the hole cutter extending through the center seat. At least one adjusting device is longitudinally mounted to the center seat and formed with an engaging portion, wherein the at least one adjusting device is expandable relative to the center seat for adjusting a distance between the engaging portion of the at least one adjusting device and a center of the center seat.

Further benefits and advantages of the present invention will become apparent after a careful reading of the detailed description with appropriate reference to the accompanying drawings.

DETAILED DESCRIPTION OF THE INVENTION

Figure 1:
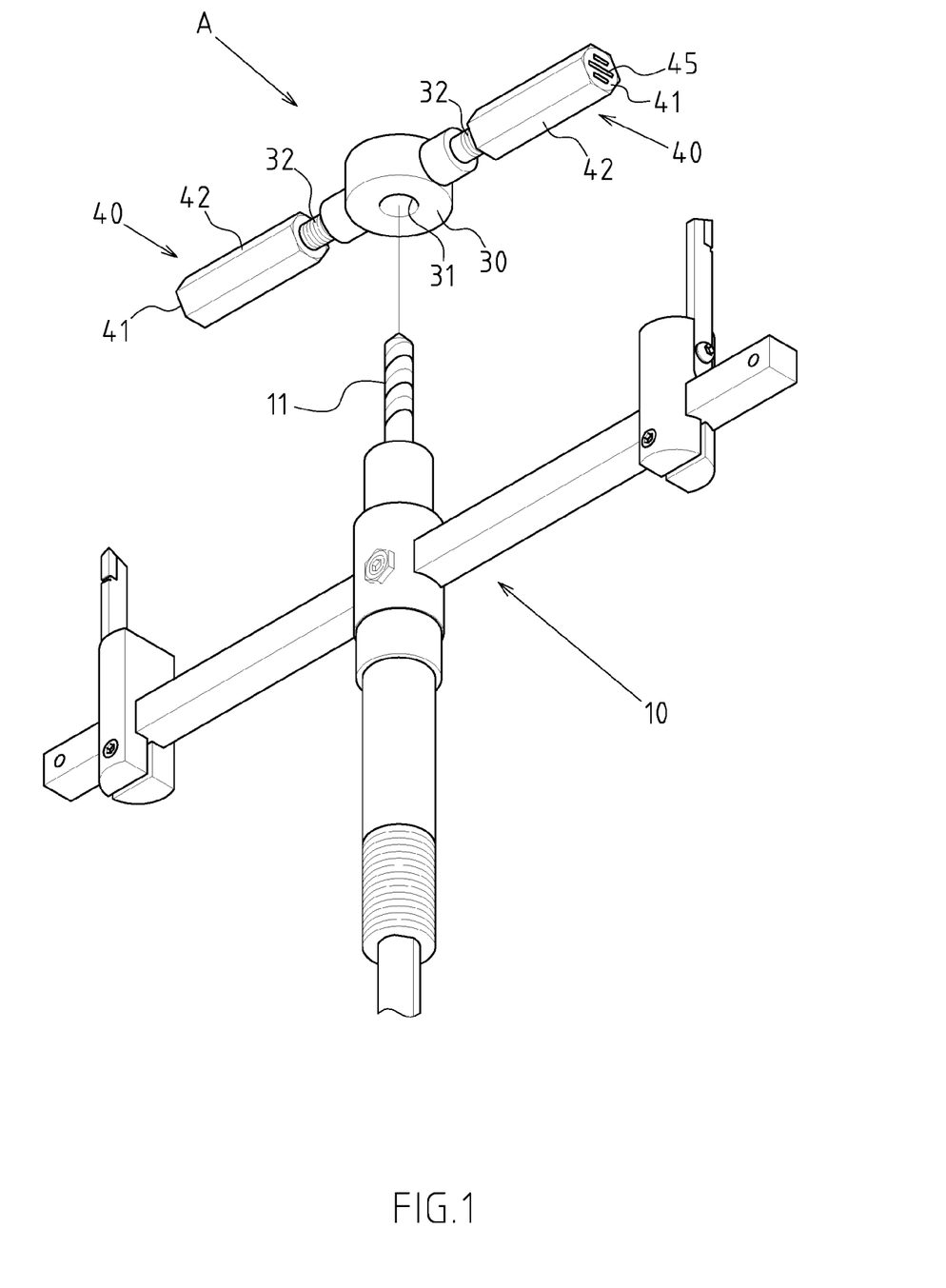
FIG. 1 is a perspective view of a hole cutter and a center locator in accordance with the present invention.
Figure 2:
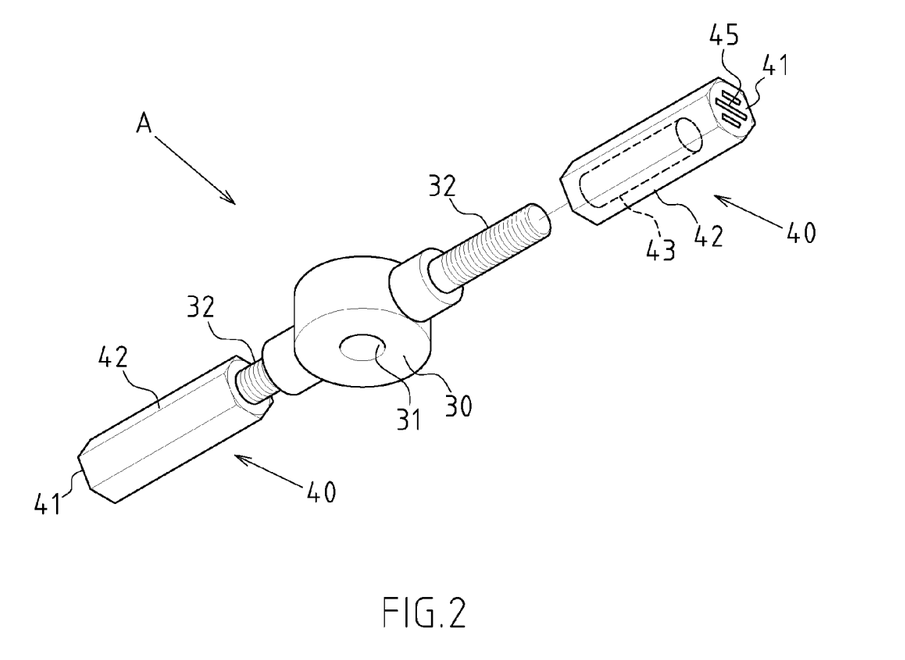
FIG. 2 is a perspective view of the center locator in accordance with the present invention.
Figure 3:
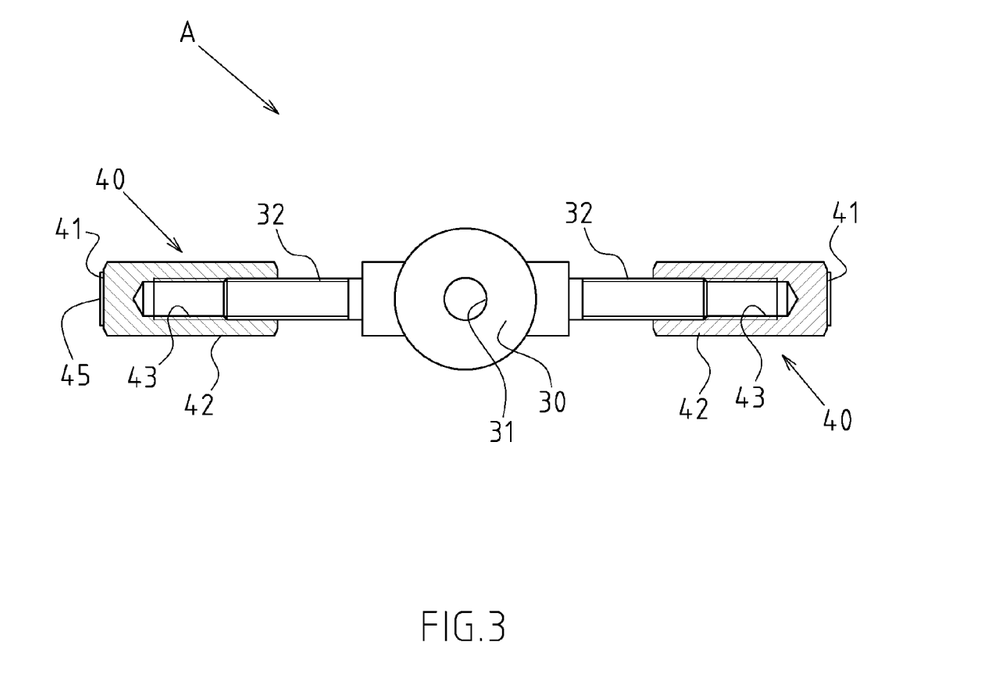
FIG. 3 is a partially cross-sectional view of the center locator in accordance with the present invention.

Referring to the drawings and initially to FIGS. 1-3, a center locator A in accordance with the present invention is operated with a hole cutter 10 and adapted for enlarging an opening 21 previously defined in a flat work-piece 20. The center locator A comprises a center seat 30 having a through hole 31 centrally defined therein. The through hole 31 is adapted to allow a centering drill 11 of the hole cutter 10 extending through the center seat 30. At least one adjusting device 40 is longitudinally mounted to the center seat 30 and formed with a engaging portion 41, wherein the at least one adjusting device 40 is expandable relative to the center seat 30 for adjusting a distance between the engaging portion 41 of the at least one adjusting device 40 and a center of the center seat 30.

The center seat 30 has two threaded rods 32 extending therefrom, wherein the two threaded rods 32 linearly correspond to each other. In the preferred embodiment of the present invention, there are two adjusting devices 40 respectively mounted to a corresponding one of the two threaded rods 32 of the center seat 30. Each adjusting device 40 includes a socket 42 having a first end and a second end. The socket 42 includes a threaded hole 43 longitudinally defined in the first end thereof and the engaging portion 41 is formed on the second end of the socket 42. Each socket 42 is screwed onto a corresponding one of the two threaded rods 32 such that the distance between the engaging portions 41 and the center of the center seat 30 is adjusted when the socket 42 is rotated relative to the corresponding threaded rod 32.

Figure 4:
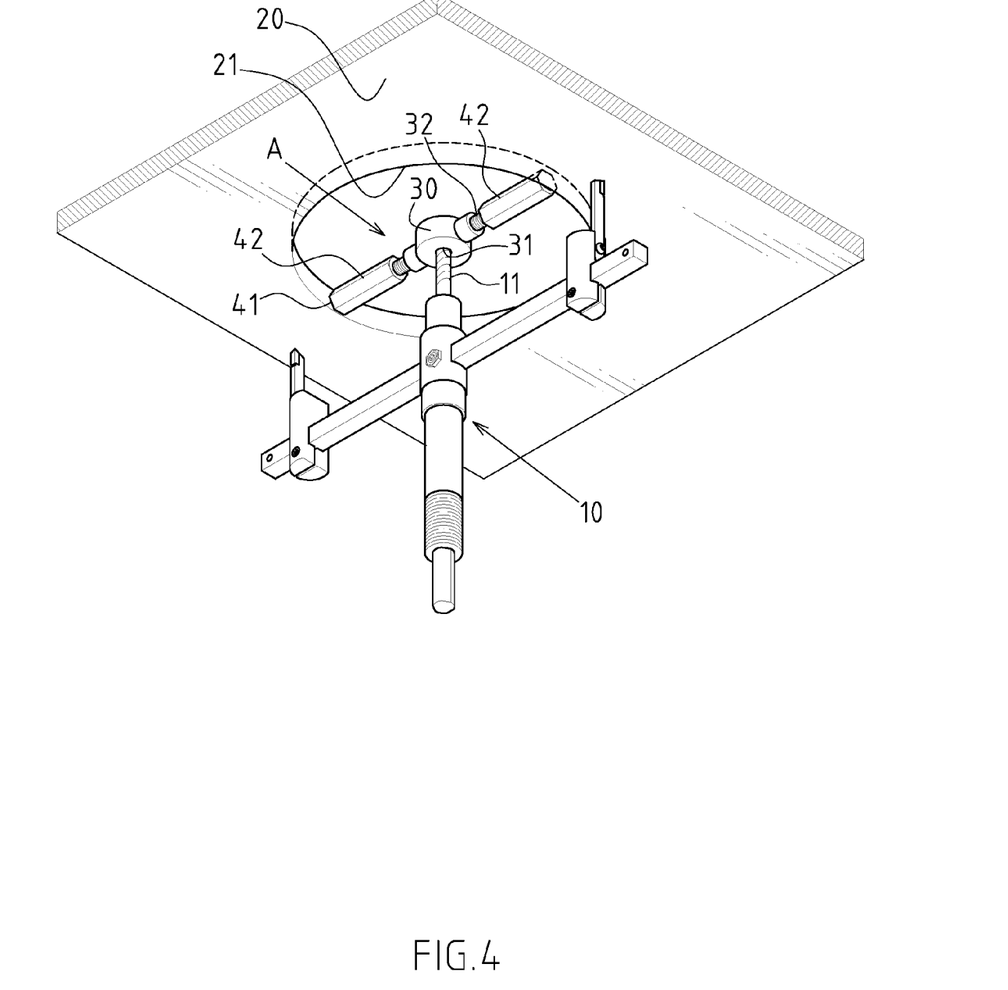
FIGS. 4-6 are operational views of the center locator in accordance with the present invention.
Figure 5:
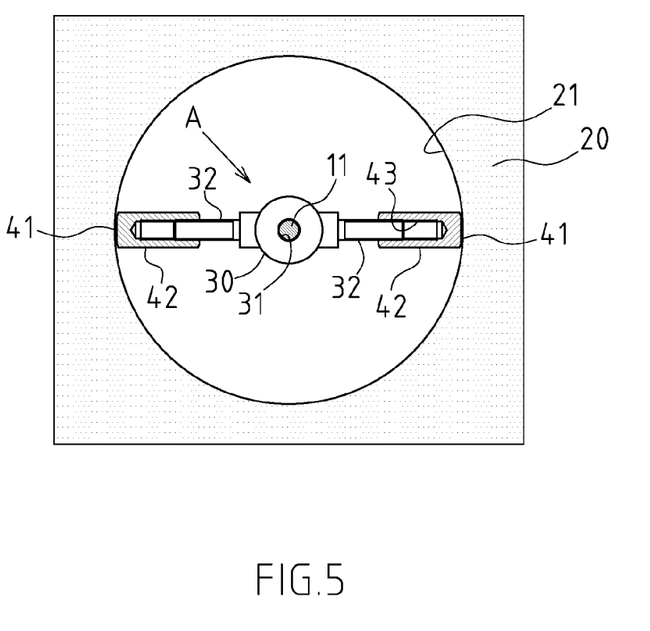
Figure 6:
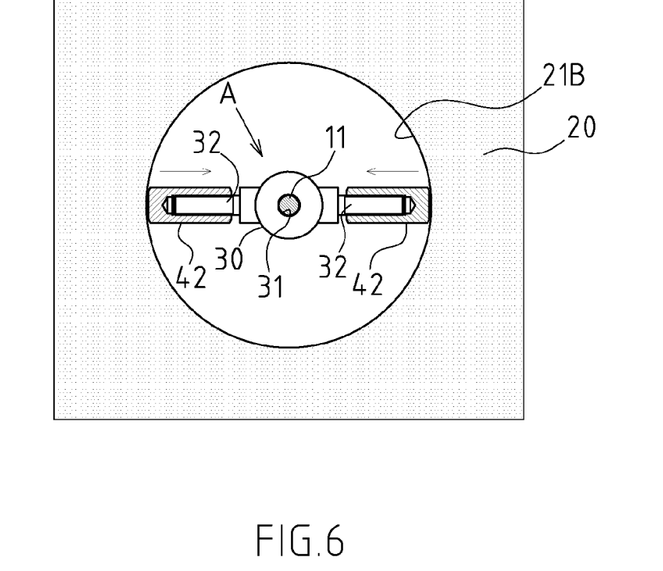

With reference to FIGS. 4 and 5, the center locator A in accordance with the present invention is operated with a hole cutter 10 and adapted for enlarging the opening 21 previously defined in the flat work-piece 20. The center seat 30 is disposed into the opening 21 and the two sockets 42 is respectively rotated to make the two engaging portions 41 respectively engaged to an inner periphery of the opening 21 when the center seat 30 concentrically corresponds to the opening 21. As a result, the center drill 11 of the hole cutter 10 can pass through the through hole 31 in the center seat 30 for drilling a center bore used as a center of a new hole having a diameter greater than that of the opening 21. The center locator A is suitable to holes with different diameters because the distance between the engaging portion 41 and the center of the center seat 30 is adjustable due to the threaded rod 32 and the threaded hole 43 in the socket 42. With reference to FIG. 6, the center locator A in accordance with the present invention is located in an opening 21B that has a diameter smaller than that of the opening 21 in FIG. 5.

Figure 7:
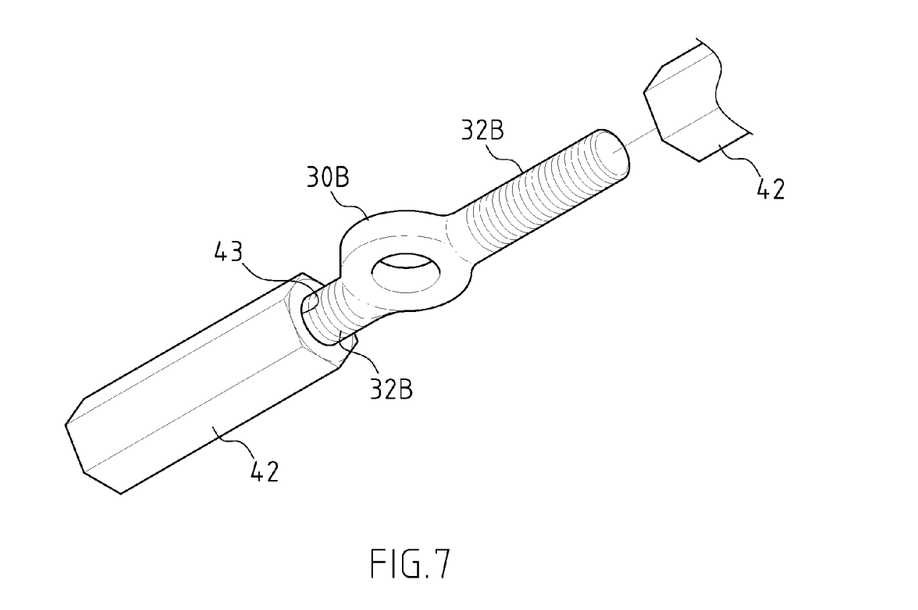
FIG. 7 is a perspective view of a second embodiment of the center locator in accordance with the present invention.

With reference to FIG. 7, the threaded rods 32B are integrally formed with the center seat 30B.

Figure 8:
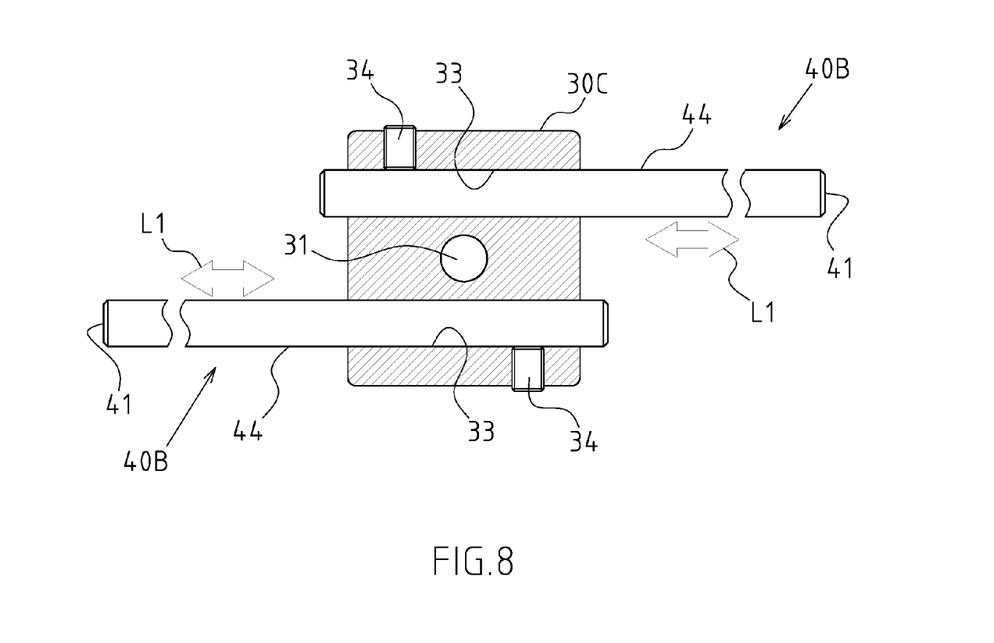
FIG. 8 is a perspective view of a third embodiment of the center locator in accordance with the present invention.

With reference to FIG. 8 that show a third embodiment of the center locator A in accordance with the present invention, in this embodiment, the center seat 30C includes two guiding holes 33 defined therein and extending therethrough, wherein the two guiding holes 33 are parallel relative to each other. The center seat 30C includes two locking members 34 respectively and selectively inserted into a corresponding one of the two guiding holes 33. The adjusting device 40B includes a shaft 44 having a first end and a second end. The first end of each of the two shafts 44 slidably extends through a corresponding one of the two guiding holes 33 such that the relative position between the center seat 30C and the shaft 44 is adjustable, shown as the arrow in FIG. 8, and the shaft 44 is positioned by a corresponding one of the two locking member 34 after extending to a suitable length relative to the center seat 30C.

Figure 9:
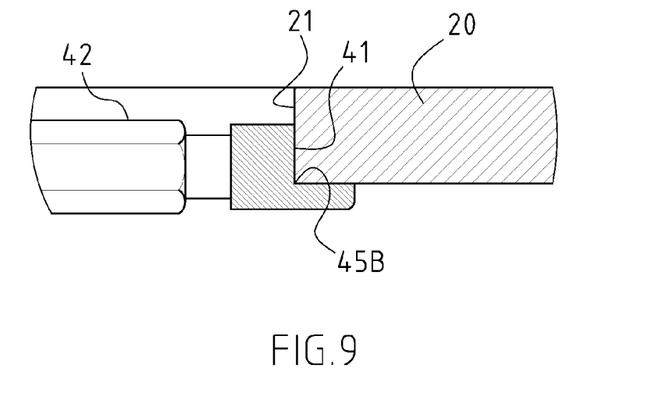
FIG. 9 is a cross-sectional view of a second embodiment of the engaging portion in accordance with the present invention.
Figure 10:
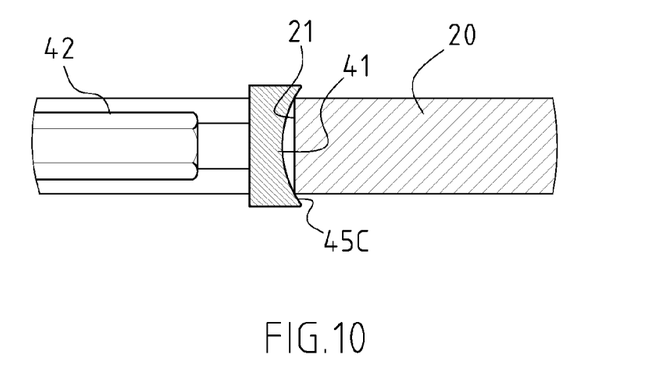
FIG. 10 is a cross-sectional view of a third embodiment of the engaging portion in accordance with the present invention.
Figure 11:
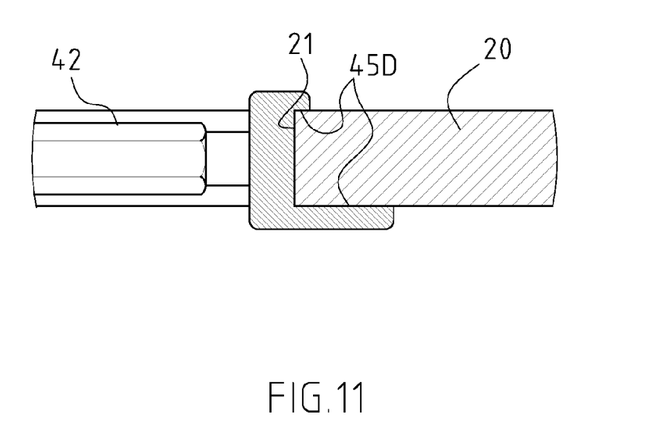
FIG. 11 cross-sectional view of a fourth embodiment of the engaging portion in accordance with the present invention.
Figure 12:
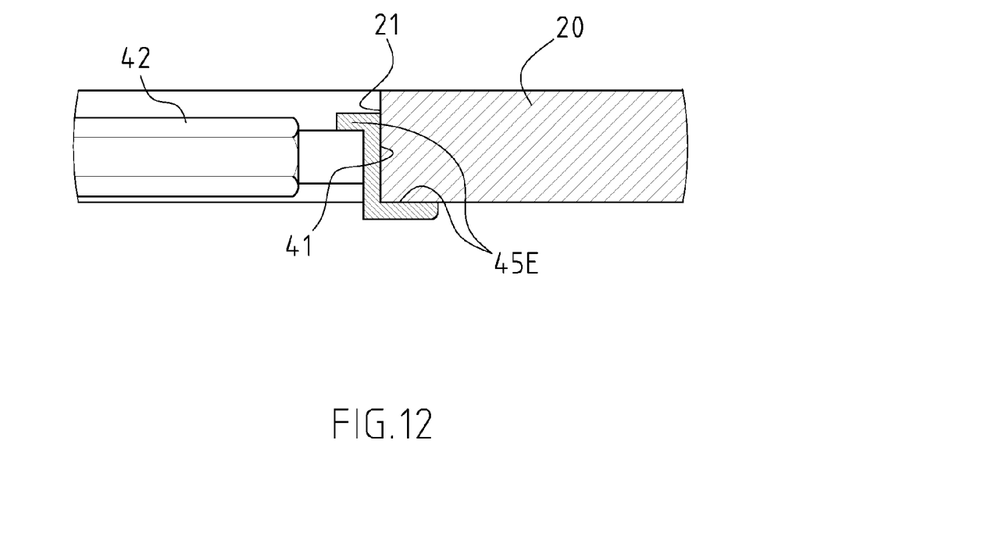
FIG. 12 cross-sectional view of a fifth embodiment of the engaging portion in accordance with the present invention.

The engaging portion 41 is formed with an engaging structure 45. With reference to FIGS. 2 and 3, the engaging structure 45 of the engaging portion 41 includes multiple ribs. With reference to FIG. 9, the engaging structure 45B is a wedge groove. With reference to FIG. 10, the engaging structure 45C is a curved groove. With reference to FIG. 11, the engaging structure 45D is a C-shaped groove. With reference to FIG. 12, the engaging structure 45D is a Z-shaped structure. The engaging structure 45, 45B, 45C, 45D, 45E is provided to enhance the connection between the engaging portion 41 and the periphery of the opening 21/21B and supply a counterforce to the hole cutter 10 when the centering drill 11 is operated. Consequently, the engaging portion 41 is hard to be detached from the periphery of the opening 21/21B during the hole cutter 10 being operated.

Figure 13:
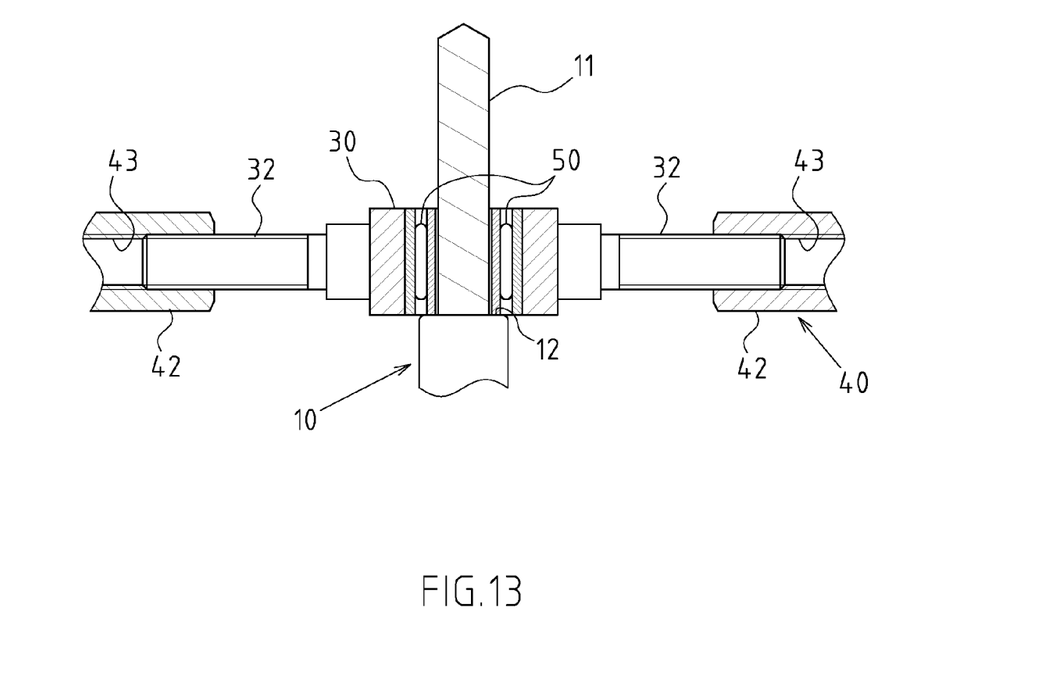
FIG. 13 is a cross-sectional view of a fourth embodiment of the center locator in accordance with the present invention.

With reference to FIG. 13, the center seat 30 further includes a bearing 50 secured in the through hole 31. The centering drill 11 is formed with a shoulder 12 abutting a distal face of the bearing 50 after the centering drill 11 extending through the through hole 31 and being operated for reducing friction force and noise.

The two threaded rods 32 of the center seat 30 have two opposite spiral directions. Accordingly, the two threaded holes 43 of the sockets 42 have two opposite spiral directions. As a result, the two sockets 42 synchronously moved relative to the center seat 30 when the center seat 30 is rotated relative to the two sockets 42 for providing a one-arm operating mode.

Figure 14:
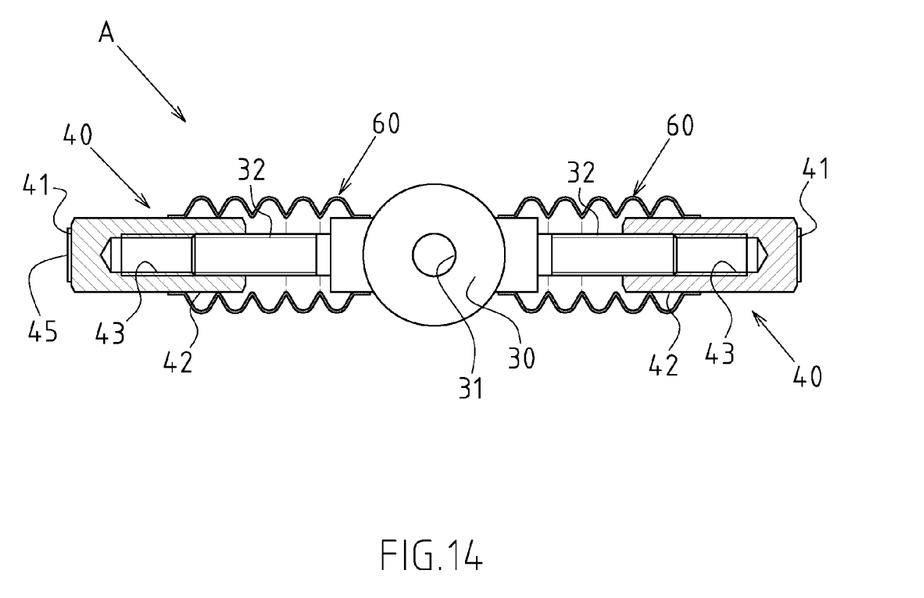
FIG. 14 is a cross-sectional view of a fifth embodiment of the center locator in accordance with the present invention.

With reference to FIG. 14, the center locator A in accordance with the present invention further includes two dust boots 60 respectively covering a corresponding one of two sockets 42 and the threaded rods 32 to prevent the dust or sawdust from adhering on the threaded rods 32 or the inner periphery of threaded hole 43. In the preferred embodiment of the present invention, the dust boot 60 is a bellow.

Figure 15:
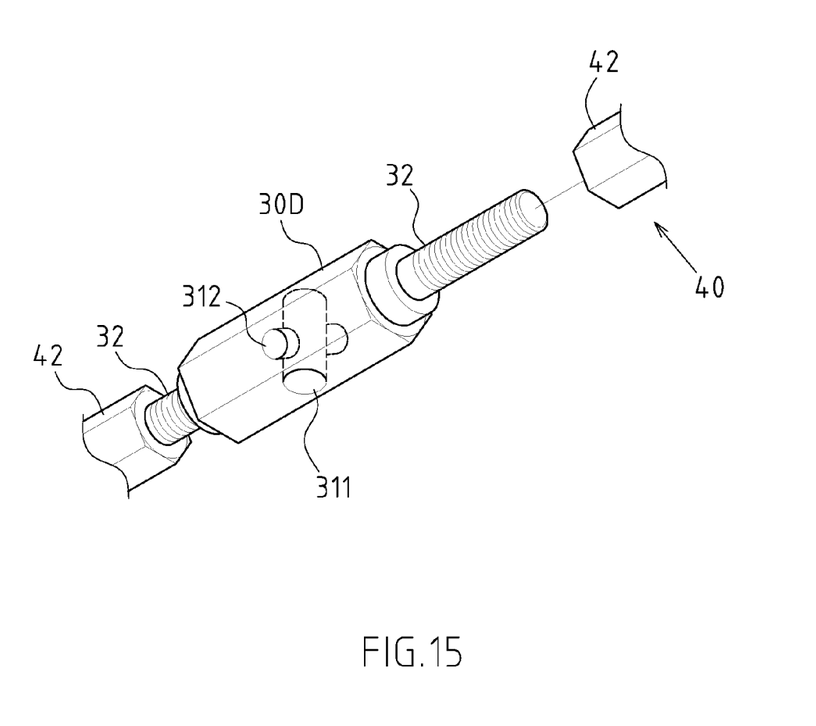
FIG. 15 is a perspective view of a sixth embodiment of the center locator in accordance with the present invention.

With reference to FIG. 15, the center seat 30D includes a first through hole 311 and a second through hole 312 defined therein, wherein the first through hole 311 has a diameter greater than that of the second through hole 312 for allowing the centering drills 11 with different diameter extending through the center seat 30D. The first through hole 331 and the second through hole 312 are crossed and the cross point of the first through hole 311 and the second through hole 312 is situated on an axis of the center seat 30D.

With reference to FIG. 15, the center seat 30D has a polygonal cross-section for operator to easily rotate the center seat 30D relative to the two adjusting device 40.

Figure 16:
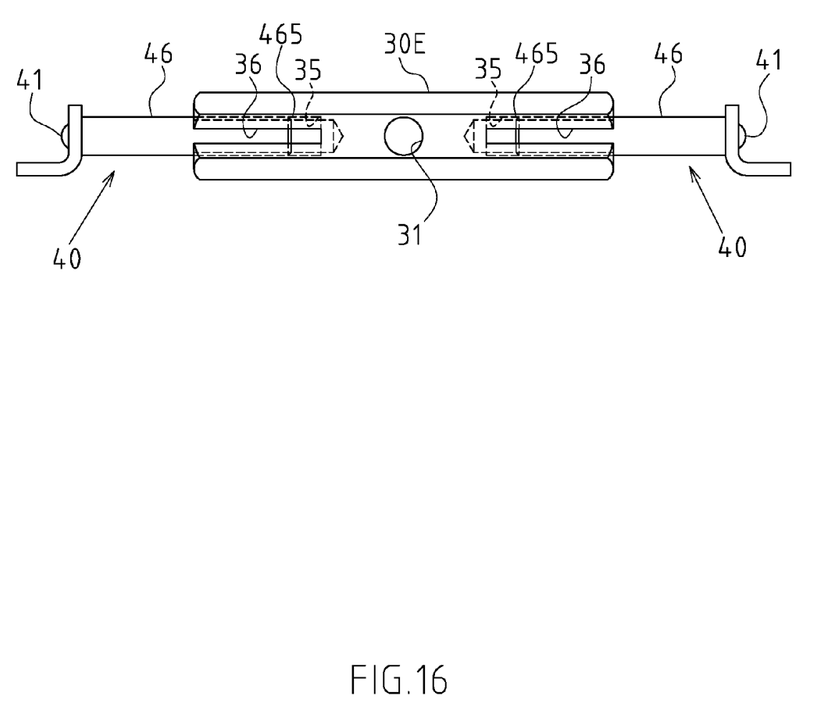
FIG. 16 is a cross-sectional view of a seventh embodiment of the center locator in accordance with the present invention.

With reference to FIG. 16, in this embodiment, the center seat 30E has two opposite ends respectively including a threaded hole 35 longitudinally defined therein. Each adjusting device 40 includes an axle 46 having a distal end formed with a threaded portion 465, wherein each threaded portion 465 is screwed into a corresponding one of the two threaded holes 35 in the center seat 30E for adjusting the total length of center locator A in accordance with the present invention when the two adjusting device 40 is rotated relative to the center seat 30E.

The center seat 30E has at least one end having a slot 36 defined therein for operator to confirm a depth that the axle 46 inserted into the threaded hole 35.

The center locator A is provided to drill a new round opening by using an old round opening, wherein the old round opening has a diameter smaller than of the new round opening and is provided to positioning the center locator A in accordance with the present invention for promoting the effect of enlarging hole.

Although the invention has been explained in relation to its preferred embodiment, it is to be understood that many other possible modifications and variations can be made without departing from the spirit and scope of the invention as hereinafter claimed.

We claim:

1. A center locator adapted to be operated with a hole cutter for enlarging a round opening, the center hole locator comprising:

a center seat having a through hole centrally defined therein, wherein the through hole is adapted to allow a centering drill of a hole cutter to extend through said center seat, said center seat having two threaded rods extend therefrom, the two threaded rods linearly corresponding to each other, two adjusting devices being respectively mounted to a corresponding one of the two threaded rods of said center seat, each adjusting device of the two adjusting devices having a socket having a first end and a second end, the socket having a threaded hole longitudinally defined in the first end thereof and an engaging portion formed on the second end of the socket, each of the sockets being screwed onto a corresponding one of the two threaded rods such that a distance between the engaging portions and a center of the center seat is adjusted when the socket is rotated relative to the corresponding threaded rod, the two threaded rods of said center seat having two opposite spiral directions and the two threaded holes of the sockets have two opposite spiral directions such that the two sockets are able to synchronously move relative to said center seat when said center seat is rotated relative to the two sockets so as to provide a one-arm operating mode; and at least one adjusting device longitudinally mounted to said center seat and formed with an engaging portion, wherein said at least one adjusting device is expandable relative to said center seat so as to adjust a distance between the engaging portion of said at least one adjusting device and the center of the center seat, the engaging portion formed with an engaging structure, the engaging structure selected from a group consisting of multiple ribs, a wedge groove, a curved groove, a C-shaped groove and a Z-shaped structure.

2. The center locator of claim 1, wherein said center seat further has a bearing secured in the through hole defined therein.

3. The center locator of claim 1, further comprising:
two dust boots respectively covering a corresponding one of the two sockets and the two threaded rods to prevent dust or sawdust from adhering on the two threaded rods and an inner periphery of the threaded hole in each socket.

4. The center locator of claim 1, wherein said center seat has a first through hole and a second through hole defined therein, the first through hole having a diameter greater than a diameter of the second through hole so as to allow centering drills with different diameters to extend through the center seat, wherein the first through hole and the second through hole are crossed and the cross point of the first through hole and the second through hole is situated on an axis of said center seat.

5. The center locator of claim 1, wherein said center seat has a first through hole and a second through hole defined therein, the first through hole having a diameter greater than that of the second through hole so as to allow the centering drills with different diameters to extend through said center seat.

6. A center locator adapted to be operated with a hole cutter for enlarging a round opening, the center locator comprising:
a center seat having a through hole centrally defined therein, wherein the through hole is adapted to allow a centering drill of a hole cutter to extend through said center seat, wherein said center seat has two threaded rods extending therefrom, the two threaded rods linearly corresponding to each other, two adjusting devices being respectively mounted to a corresponding one of the two threaded rods of said center seat, each adjusting device of the two adjusting devices having a socket having a first end and a second end, the socket having a threaded hole longitudinally defined in the first end thereof and an engaging portion formed on the second end of the socket, each of the sockets being screwed onto a corresponding one of the two threaded rods such that a distance between the engaging portions and a center of said center seat is adjusted when the socket is rotated relative to the corresponding threaded rod, said center seat includes a first through hole and a second through hole defined therein, the first through hole having a diameter greater than a diameter of the second through hole for allowing centering drills with different diameters to extend through said center seat, the first through hole and the second through is being crossed and the cross point of the first through hole and the second through hole being situated on an axis of said center seat; and at least one adjusting device longitudinally mounted to the center seat and formed with an engaging portion, wherein the at least one adjusting device is expandable relative to the center seat for adjusting a distance between the engaging portion of the at least one adjusting device and the center of the center seat.

7. The center locator of claim 6, wherein the two threaded rods of the center seat have two opposite spiral directions and the two threaded holes of the sockets have two opposite spiral directions such that the two sockets synchronously move relative to said center seat when said center seat is rotated relative to the two sockets so as to provide a one-arm operating mode.

* * * * *